(12) United States Patent  (10) Patent No.: US 7,748,841 B1
Simon et al.  (45) Date of Patent: Jul. 6, 2010

(54) SIDE-VIEW MIRROR ATTACHMENT FOR SPECTACLES

(76) Inventors: Johnny Simon, 409 1st St., Orlando, FL (US) 32824; Karen Simon, 409 1st St., Orlando, FL (US) 32824

( * ) Notice: Subject to any disclaimer, the term of this patent is extended or adjusted under 35 U.S.C. 154(b) by 0 days.

(21) Appl. No.: 11/874,997

(22) Filed: Oct. 19, 2007

(51) Int. Cl.
 *G02C 7/14* (2006.01)
(52) U.S. Cl. .......................................... 351/50; 351/158
(58) Field of Classification Search .................. 351/50, 351/41, 158
See application file for complete search history.

(56) References Cited

U.S. PATENT DOCUMENTS

| | | | | |
|---|---|---|---|---|
| 1,074,145 | A | * | 9/1913 | Walts .......................... 351/50 |
| 4,733,958 | A | * | 3/1988 | Gorsich ....................... 351/158 |
| 5,020,897 | A | * | 6/1991 | Frye ........................... 359/880 |

\* cited by examiner

*Primary Examiner*—Hung X Dang

(57) ABSTRACT

A side-view mirror attachment for a pair of spectacles constructed of a pair of mirrors each having a hemispherical shape, a center frame that has two opposite ends each fixedly connected to one of the pair of mirrors, and a mounting device for either detachably or permanently mount the attachment to a pair of spectacles.

6 Claims, 4 Drawing Sheets

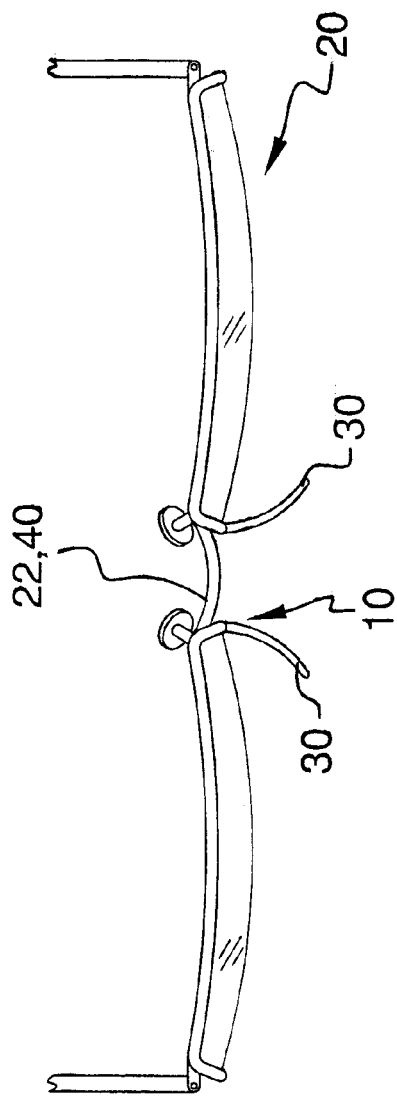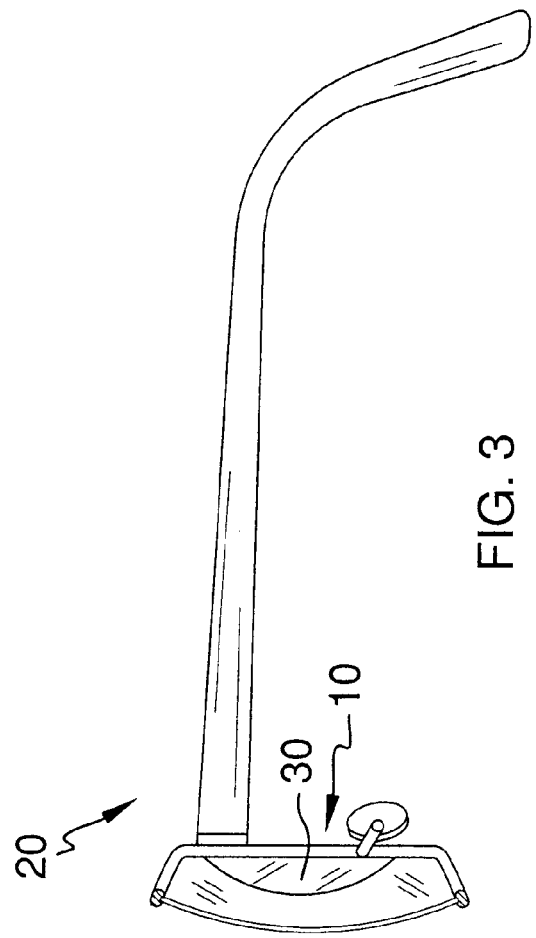

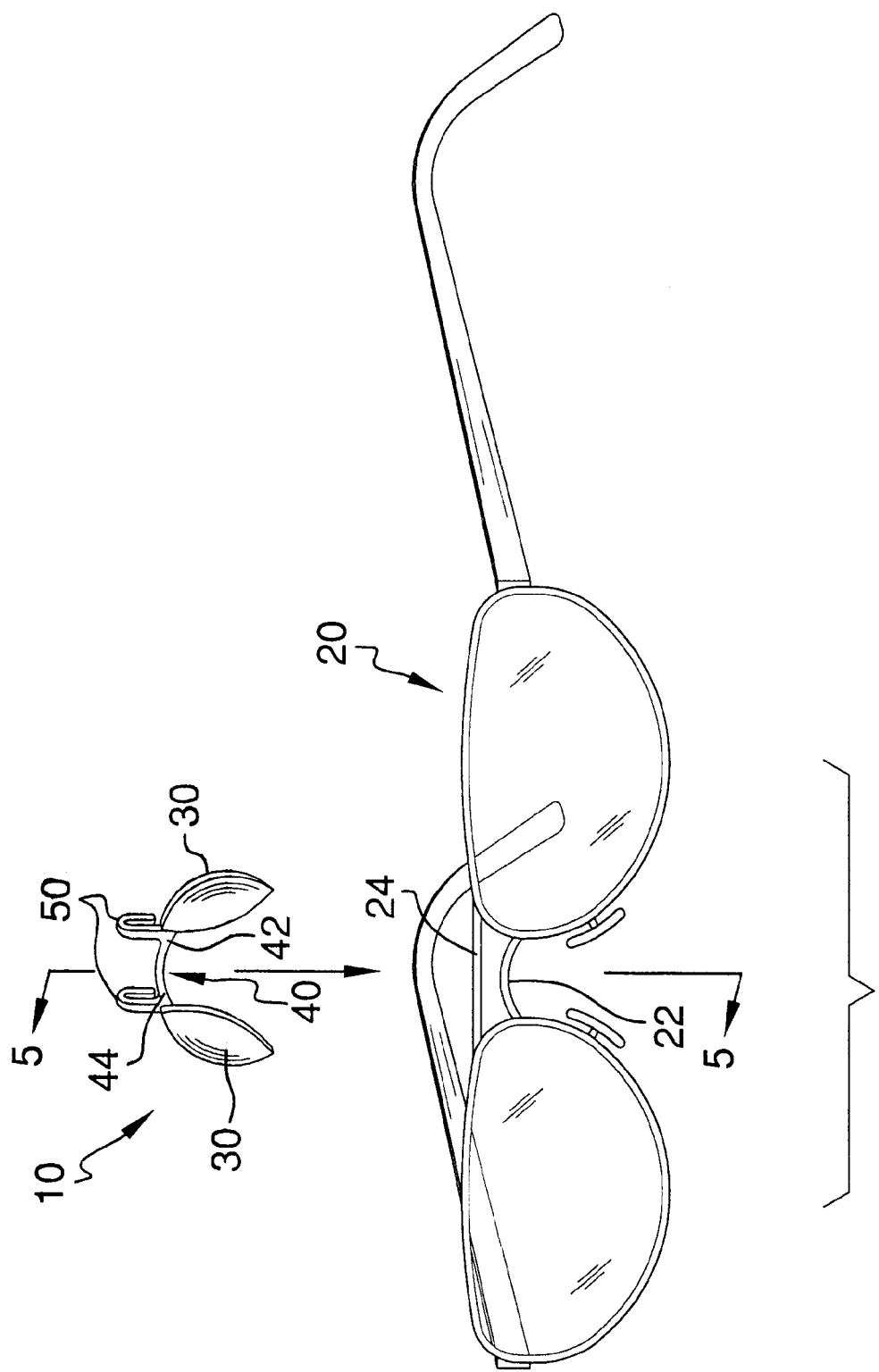

SIDE-VIEW MIRROR ATTACHMENT FOR SPECTACLES

FIELD OF THE INVENTION

The present invention generally relates to an accessory for spectacles and more particularly, relates to a side-view mirror attachment for spectacles that can be removably mounted or permanently mounted.

BACKGROUND OF THE INVENTION

Spectacles or eyeglasses have been used for centuries by people to improve their vision or to shelter their eyes from the sun. The spectacles that are currently available in the marketplace while improving a person's vision in the forward direction, they do not improve a person's peripheral vision which may be important in certain situations. For instance, for people who are suffering with the disease of glaucoma or other eye problems, their peripheral vision is greatly affected and therefore needs a remedial device to help them improving their peripheral visions. It is therefore desirable to provide a device that can be either detachably mounted or permanently mounted on a person's spectacles to allow the person to view items to their sides without having to turn their heads.

It is therefore an object of the present invention to provide a spectacles for improving a person's peripheral vision that does not have the drawbacks or shortcomings of the conventional spectacles.

It is another object of the present invention to provide side-view mirror attachment for spectacles that can be detachably mounted on a person's spectacles.

It is a further object of the present invention to provide side-view mirror attachment that can be permanently mounted on a person's spectacles.

SUMMARY OF THE INVENTION

In accordance with the present invention, a side-view mirror attachment for spectacles for improving a person's peripheral vision is provided.

In a preferred embodiment, the present invention side-view mirror attachment for spectacles is constructed of a pair of mirrors each having a hemispherical shape, an inner surface of mirror finish and an outer surface; a center frame that has two opposite ends each fixedly connected to one of the pair of mirrors with an inner surface facing rearwardly toward a wearer such that a side-view of a scenery to the side of the wearer can be seen on the mirrored inner surface by the wearer; and a mounting device on the center frame for mounting the side-view mirror attachment onto a spectacle.

BRIEF DESCRIPTION OF THE DRAWINGS

The invention will now be described, by way of example, with reference to the accompanying drawings, in which:

FIG. 2 is a top view of the present invention spectacles shown in FIG. 1.

FIG. 3 is a side view of the present invention spectacles shown in FIG. 1.

FIG. 4 is a perspective view of a detachable side-view mirror attachment positioned over a pair of spectacles.

DETAILED DESCRIPTION OF THE PREFERRED EMBODIMENT

The present invention discloses a side-view mirror attachment for use on a pair of spectacles that can be either detachably mounted or can be permanently mounted.

The present invention side-view mirror attachment for spectacles is an accessory for various optical products designed to improve a user's peripheral vision. It can be secured to prescription glasses, sunglasses, reading glasses, etc. to allow individuals to view items to their sides without having to turn their head. While the side-view mirror attachment can be of use to a wide variety of individuals, it is particularly appealing to individuals with glaucoma or other adverse eye conditions which may have poor peripheral vision. The present invention side view mirror attachment consists of a section of mirrored plastic lenses that measures about ⅛ inch think that rests within an acrylic frame. The product can be produced in the shape of a half circle, i.e. in a hemispherical shape, and can be positioned on top of the nosepiece of the spectacles. It can be temporarily (detachably) or permanently secured to the pair of spectacles. It may contain a hinge through which it can be flipped upward out of the individuals view. The side-view mirror attachment may have a dimension that measures about 1 inch long and about 1 inch wide.

The present invention side-view mirror attachment for spectacles fulfills the need for an optical accessory designed to allow individuals to see objects to there sides. The appealing features of the side-view mirror attachment are its ability to improve the users peripheral vision, as well as its safety, convenience, practicality, ease of placement, and reasonable price. The side-view mirror attachment can be temporality or permanently secured to the nosepieces of the glasses in order to provide a mirrored surface through which wearers can see in their periphery. Thus, the use of the side-view mirror attachment can provide improved visual acuity. It is particularly appealing to individuals with various eye conditions such as glaucoma who may loose their side vision. It would provide these individuals with added safety and piece of mind. The present invention side-view mirror attachment can be secured to prescription glasses, reading glasses, and sunglasses.

Figure 1:
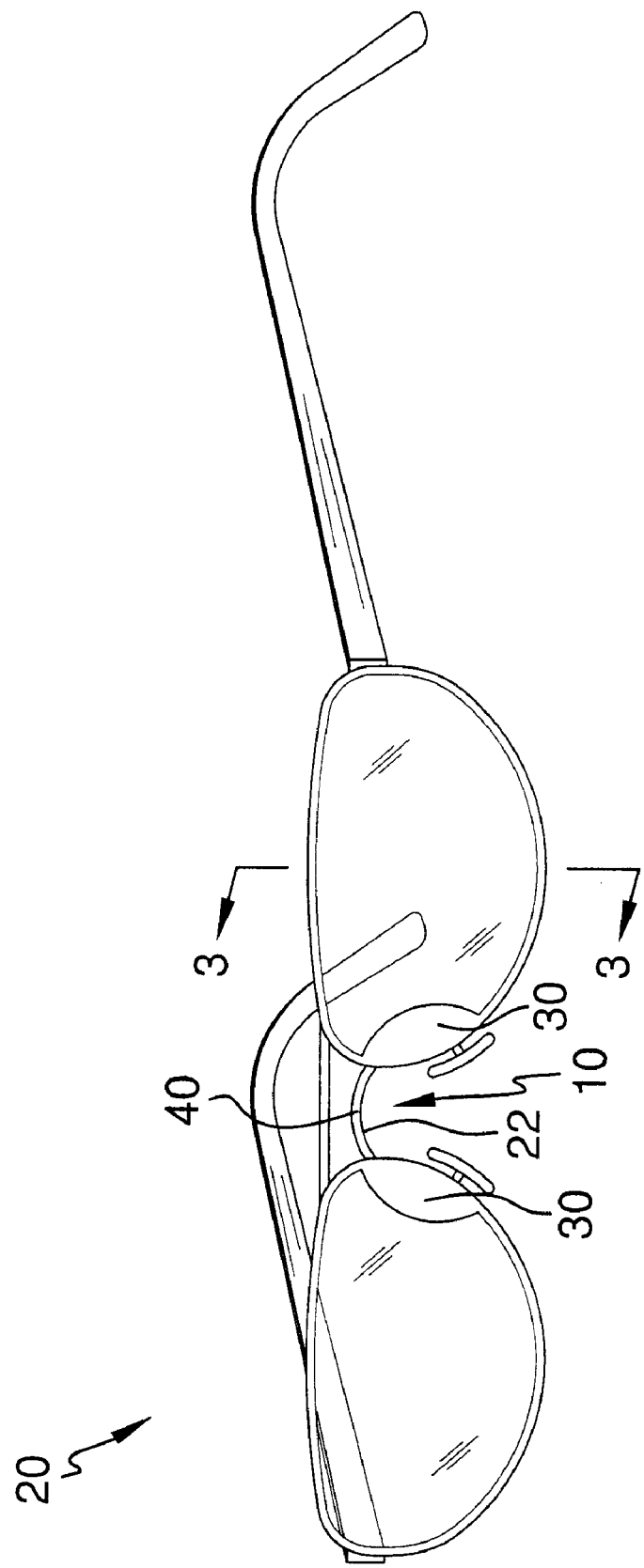
FIG. 1 is a perspective view of the present invention side-view mirror attachment that is permanently mounted on a pair of spectacles.
Figure 5:
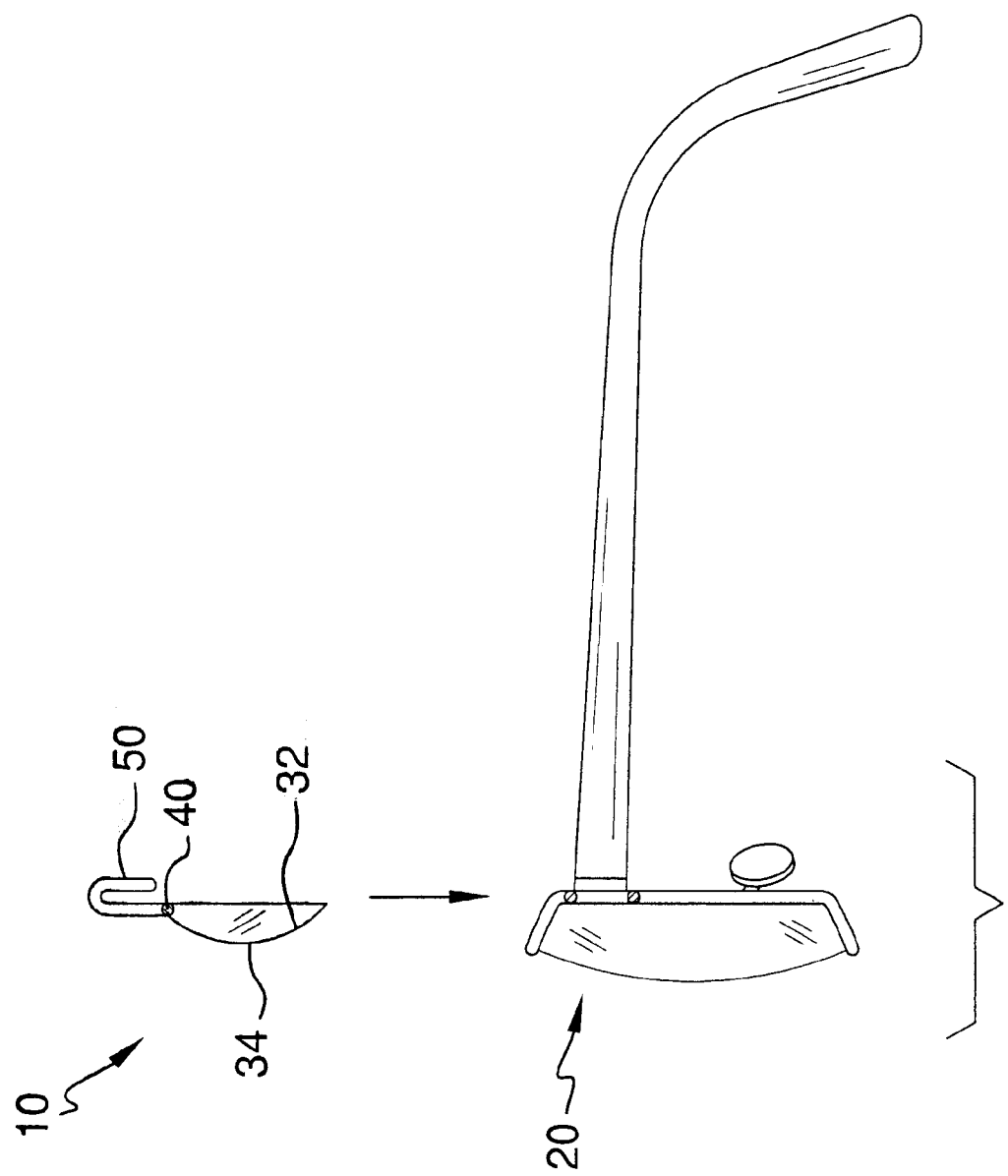
FIG. 5 is a side-view of the detachable side-view mirror attachment and the pair of spectacles shown in FIG. 4.

Referring initially to FIG. 1, wherein a present invention side-view mirror attachment 10 is shown permanently installed on a pair of spectacles 20. The side view mirror attachment 10 is constructed of, as shown in FIGS. 1-5, a pair of mirrors 30 each has a hemispherical shape, an inner surface 32 of mirror finish and an outer surface 34. This is best shown in FIG. 5. A center frame 40, best shown in FIG. 4, that has two opposite ends 42, 44 each fixedly connected to one of the pair of mirrors 30 with the inner surface 32 facing rearwardly toward a wearer (not shown) such that a side view of a scenery to the side of the wearer can be seen on the mirrored inner surface 32 by the wearer.

The present invention side-view mirror attachment 10 can be either mounted on a pair of spectacles 20 in a detachable manner or in a permanent manner. FIGS. 1,2 and 3 shows the attachment 10 mounted on the pair of spectacles 20 in a permanent manner wherein the center frame 40 can be either formed as an integral part with the bridge piece 22, shown in FIG. 4, of the pair of spectacles 20, or can be permanently bonded to the bridge piece 22 such that the side-view mirror attachment 10 cannot be separated.

In the detachable model of the present invention side-view mirror attachment 10, shown in FIG. 4, additional clips 50 which can be advantageously molded as a single piece in a plastic material with the bridge piece 40 are provided for clipping onto the bridge member 24 shown in FIG. 4. In this embodiment, the side view mirror attachment 10 can be detached easily for mounting on various perspiration glasses, sunglasses, reading glasses, etc. The glass mirror can also be made of convex plastic and the frames made of metal or plastic with a dimension of about 1 inch by 1 inch.

The present invention side-view mirror attachment for spectacles has therefore been amply described in the above descriptions and in the appended drawings of FIGS. 1-5.

While the preferred embodiments of the invention have been described above, it will be recognized and understood that various modifications can be made in the invention and the appended claims are intended to cover all such modifications which may fall within the spirit and scope of the invention.

What is claimed is:

1. A side-view mirror attachment for spectacles comprising:

a pair of mirrors fabricated in plastic each having a hemispherical shape, a convex inner surface of mirror finish and an outer surface;

a center frame having two opposite ends each fixedly connected to one of said pair of mirrors with an inner surface facing rearwardly toward a wearer such that a side-view of a scenery to the side of the wearer can be seen on said mirrored inner surface by the wearer; and a mounting device on said center frame for mounting said side-view mirror attachment onto a spectacle.

2. The side-view mirror attachment for spectacles according to claim 1, wherein said mounting device is a pair of clips for detachably clipping to a pair of spectacles.

3. The side-view mirror attachment for spectacles according to claim 1, wherein said mounting device is a pair of clips that are formed integrally with the center frame in a plastic molding process.

4. The side-view mirror attachment for spectacles according to claim 1, wherein said mounting device is a center frame that is permanently bonded to a bridge piece on a pair of spectacles.

5. The side-view mirror attachment for spectacles according to claim 1, wherein said pair of mirror and said center frame are fabricated in a plastic material.

6. The side-view mirror attachment for spectacles according to claim 1, wherein said mounting device is a pair of clips formed of metal.

\* \* \* \* \*